US007522595B2

(12) United States Patent
Ben-Dvora et al.

(10) Patent No.: US 7,522,595 B2
(45) Date of Patent: Apr. 21, 2009

(54) COMMUNICATING PACKETS BETWEEN FORWARDING CONTEXTS USING VIRTUAL INTERFACES

(75) Inventors: Nir Ben-Dvora, Herzltya (IL); Doron Oz, Even Yehuda (IL); Sarel Altshuler, Haifa (IL); Warren Scott Wainner, Potomac Falls, VA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 11/454,278

(22) Filed: Jun. 16, 2006

(65) Prior Publication Data

US 2007/0291752 A1    Dec. 20, 2007

(51) Int. Cl.
*H04L 12/28* (2006.01)

(52) U.S. Cl. .................. 370/389; 370/230; 370/235; 370/351; 370/395.31; 370/400; 709/211; 709/215; 709/229; 709/238

(58) Field of Classification Search .......... 370/230, 370/235, 253, 351, 352, 389, 390, 395.31, 370/395.35, 400, 401; 709/211, 215, 217, 709/229, 236, 238
See application file for complete search history.

(56) References Cited

U.S. PATENT DOCUMENTS

| | | | |
|---|---|---|---|
| 7,161,904 B2* | 1/2007 | Hussain et al. | 370/230 |
| 7,185,106 B1* | 2/2007 | Moberg et al. | 709/238 |
| 7,263,091 B1* | 8/2007 | Woo et al. | 370/351 |
| 7,340,535 B1* | 3/2008 | Alam | 709/246 |
| 2002/0097730 A1* | 7/2002 | Langille et al. | 370/401 |
| 2003/0086422 A1* | 5/2003 | Klinker et al. | 370/389 |
| 2003/0135578 A1* | 7/2003 | Banga et al. | 709/215 |
| 2003/0165144 A1* | 9/2003 | Wang | 370/400 |
| 2004/0013120 A1* | 1/2004 | Shen | 370/395.31 |
| 2004/0105438 A1* | 6/2004 | Moon et al. | 370/389 |
| 2004/0240455 A1* | 12/2004 | Shen | 370/400 |

FOREIGN PATENT DOCUMENTS

WO    WO/03/103237    12/2003

* cited by examiner

*Primary Examiner*—Edan Orgad
*Assistant Examiner*—Andrew C Lee
(74) *Attorney, Agent, or Firm*—The Law Office of Kirk D. Williams

(57) ABSTRACT

Packets are communicated between forwarding contexts (e.g., virtual routers, logical routers, and/or private networks) using virtual interfaces in communications and computing systems, especially routers, packet switching systems, and other devices. A virtual interface refers to the interface infrastructure (e.g., buffers, memory locations, other data structures), but does not connect to an external cable or other communications mechanism such as is a physical interface. Packets are moved between forwarding contexts by automatically moving a packet placed in a first virtual interface associated with a first forwarding context to a second virtual interface associated with a second forwarding context (assuming the packet is not dropped by a feature applied to the packet at the first virtual interface).

32 Claims, 11 Drawing Sheets

COMMUNICATING PACKETS BETWEEN FORWARDING CONTEXTS USING VIRTUAL INTERFACES

TECHNICAL FIELD

One embodiment of the invention relates to communications and computer systems, especially routers, packet switching systems, and other devices; and more particularly, one embodiment relates to communicating packets between forwarding contexts using virtual interfaces.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Packet switching devices have evolved from devices where each device represents a single router or bridge, to devices that support multiple "forwarding contexts." As used herein, forwarding contexts include, but are not limited, to virtual routers, logical routers, and/or virtual private networks. Each forwarding context maintains or is associated with packet forwarding information relevant to itself. For example, two logical routers might be housed in the same physical device, but these different forwarding contexts will maintain separate routing tables and forwarding information based for use in processing and forwarding packets.

Of course, this processing of packets in one forwarding context may determine that certain packets should be communicated to a different forwarding context. In the past, this has meant that the packet should be sent to a different packet switching device. However, today, it is possible that these different forwarding contexts are housed in a same physical packet switch, such as in different logical or virtual routers of a single physical router.

One prior approach used to communicate packets between two forwarding contexts, especially between logical routers (e.g., where each line card only belongs to a single forwarding context), is illustrated in FIG. 1A. Shown is a packet switch 100, which includes three forwarding contexts 101, 102 and 103, with these devices having physical interfaces 111-116. This approach uses physical cables 121-123 to connect different forwarding contexts 101-103, which requires a technician to correctly connect a physical cables for each pair of forwarding contexts.

Another prior approach used to communicate packets between two forwarding contexts, especially between virtual routers, is illustrated in FIG. 1B. Shown is a packet switch 140 which includes three forwarding contexts 141, 142 and 143. These forwarding contexts use interprocess communication 151-156 (e.g., standard IPC or specialized hardware or software) to communicate packets between these forwarding contexts 141-143. This approach requires specialized hardware and software development in order to communicate packets as well as to provide for mechanisms for applying features to these packets. Examples of such features, include, but are not limited to: access control lists (ACLs), quality of service (QoS) (e.g., committed access rate, rate-limiting, shaping, marking, etc.), aggregated/sampled Netflow accounting, unicast reverse-path forwarding (uRPF), policy-based routing, Border Gateway Protocol (BGP) policy accounting, QoS policy propagation via BGP, accounting, statistics, web cache redirect, lawful Interception, IPSec encryption/decryption, intrusion detection and prevention, state-full firewall, network address translation, and network-based application recognition.

SUMMARY

Disclosed are, inter alia, methods, apparatus, data structures, computer-readable media, mechanisms, and means for communicating packets between forwarding contexts using virtual interfaces in communications and computing systems, especially routers, packet switching systems, and other devices. As used herein, a virtual interface refers to the interface infrastructure (e.g., buffers, memory locations, other data structures), but does not connect to an external cable or other communications mechanism such as is a physical interface.

One embodiment includes: a first forwarding context configured to identify forwarding information for packets based on a first forwarding information base; a second forwarding context configured to identify forwarding information for packets based on a second forwarding information base; a first virtual interface configured to receive packets, the first virtual interface being associated with the first forwarding context; a second virtual interface configured to send packets, the second virtual interface being associated with the second forwarding context; and a context forwarder, coupled to the first and second virtual interfaces, configured to automatically move all packets that are received by the first virtual interface but not dropped at the first virtual interface into the second virtual interface. The first forwarding context is configured to determine for a particular packet based on the first forwarding information base to forward the particular packet to the second forwarding context, and in response to said determination, the first forwarding context is configured to move the particular packet into the first virtual interface; wherein the apparatus is configured such that the particular packet will not be dropped at the first interface. One embodiment includes a context forwarder to provide interconnectivity between multiple forwarding contexts, such that a same virtual interface can be used to communicate packets to different forwarding contexts. In one embodiment, each of the first and second virtual interfaces are bi-directional, such that a packets can be automatically moved from the first to the second virtual interface, and from the second to the first virtual interface.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
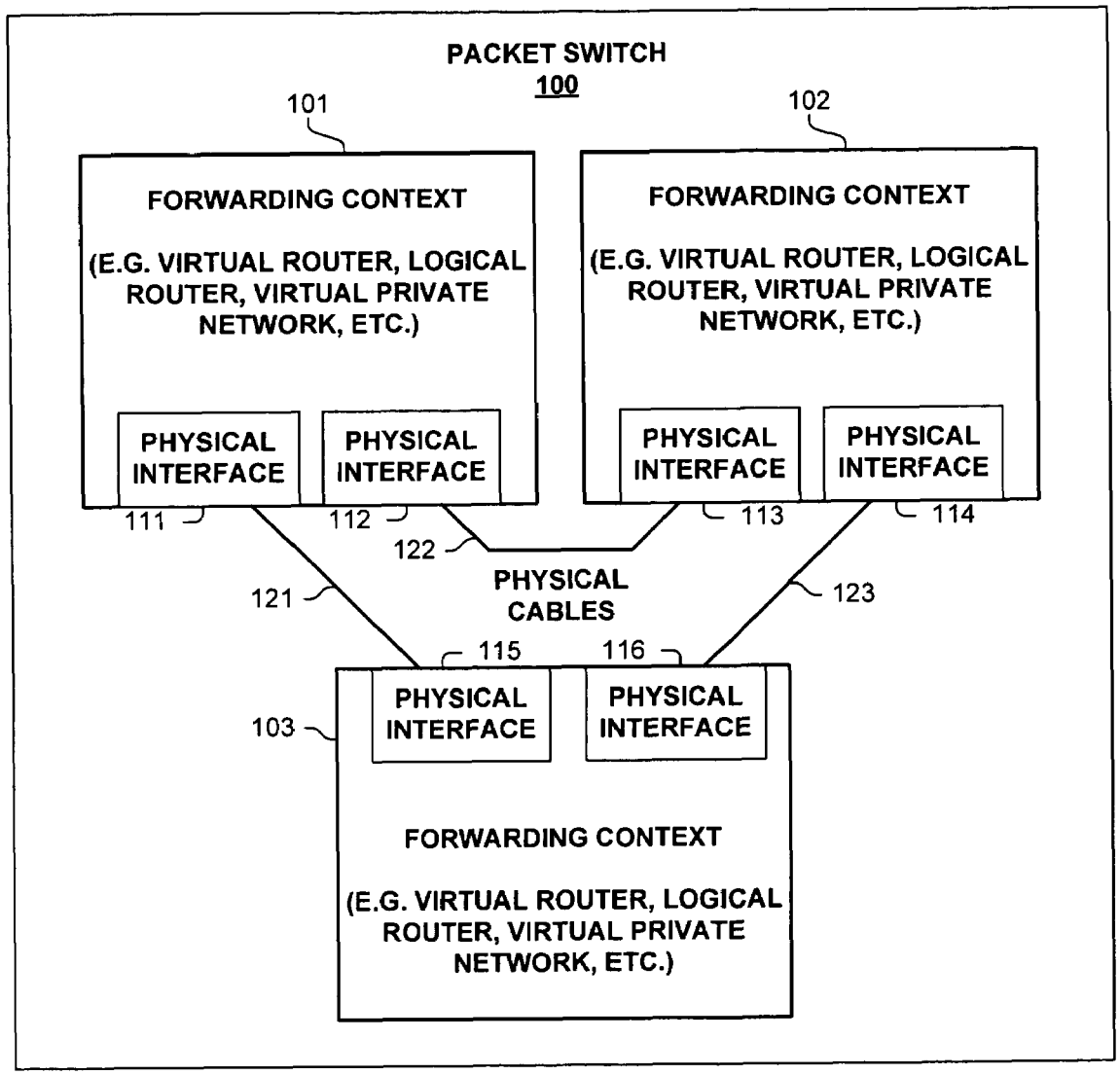
FIGS. 1A-B prior art network configurations.
Figure 1B:
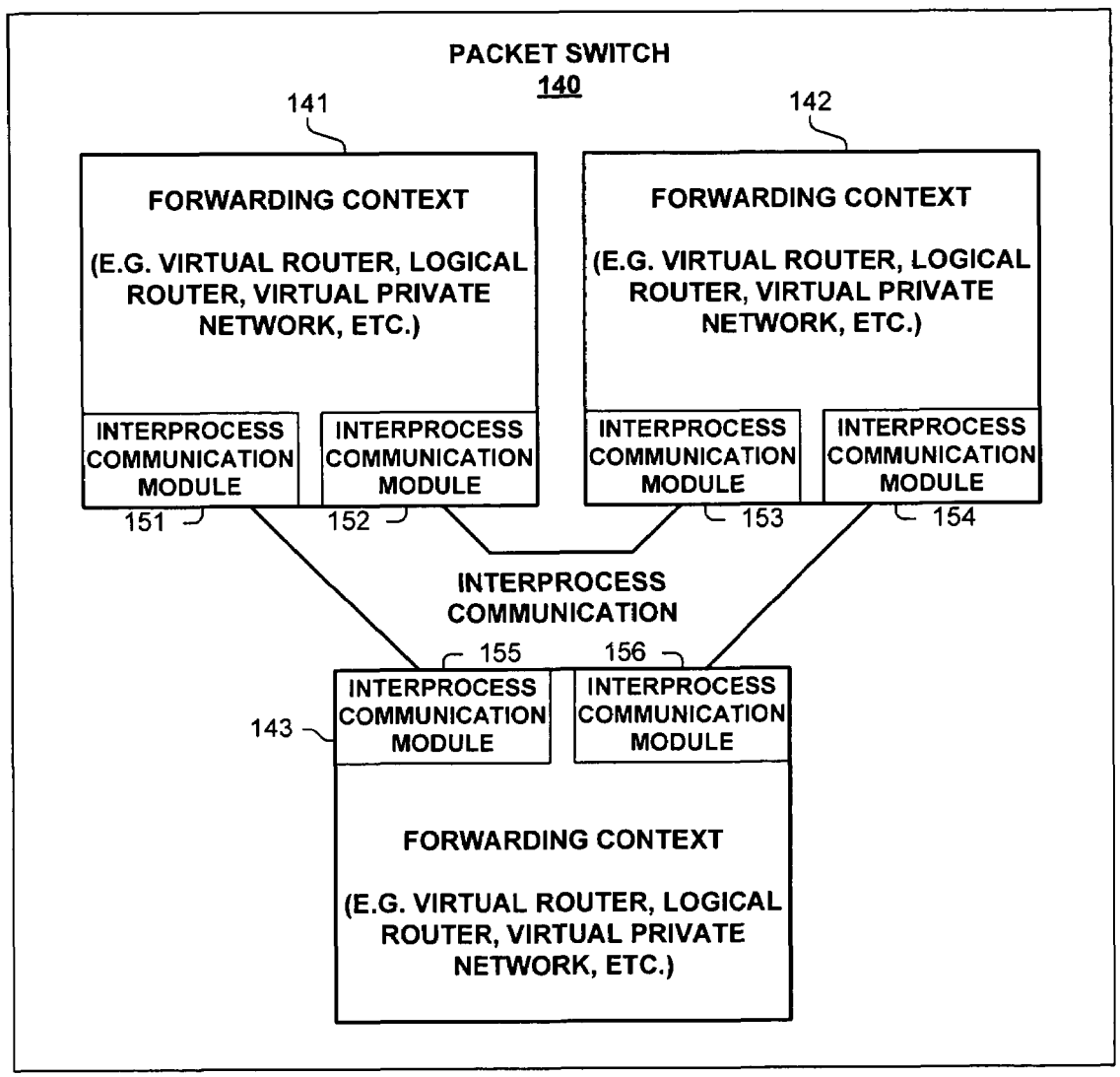

Disclosed are, inter alia, methods, apparatus, data structures, computer-readable media, mechanisms, and means for communicating packets between forwarding contexts using virtual interfaces in communications and computing systems, especially routers, packet switching systems, and other devices.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, mechanisms, and means for communicating packets between forwarding contexts using virtual interfaces in communications and computing systems, especially routers, packet switching systems, and other devices. One embodiment includes: a first forwarding context configured to identify forwarding information for packets based on a first forwarding information base; a second forwarding context configured to identify forwarding information for packets based on a second forwarding information base; a first virtual interface configured to receive packets, the first virtual interface being associated with the first forwarding context; a second virtual interface configured to send packets, the second virtual interface being associated with the second forwarding context; and a context forwarder, coupled to the first and second virtual interfaces, configured to automatically move all packets that are received by the first virtual interface but not dropped at the first virtual interface into the second virtual interface. The first forwarding context is configured to determine for a particular packet based on the first forwarding information base to forward the particular packet to the second forwarding context, and in response to said determination, the first forwarding context is configured to move the particular packet into the first virtual interface; wherein the apparatus is configured such that the particular packet will not be dropped at the first interface.

One embodiment includes: a first forwarding context application processor configured to apply one or more features to said packets received by the first virtual interface; and wherein the context forwarder is configured to said automatically move all packets not dropped by said application of said features to the second virtual interface. In one embodiment, the apparatus is configured to apply one or more features to said packets in the first virtual interface and second virtual interface. One embodiment includes a statistics collector coupled to the second virtual interface configured to collect statistics for use in processing said packets moved to the second virtual interface. In one embodiment, the apparatus is configured to collect statistics on packets received into the first virtual interface for use in processing said packets in the first virtual interface and is configured to collect statistics on packets received into the second virtual interface for use in processing said packets in the second virtual interface.

One embodiment for processing packets includes the ability to move packets between forwarding contexts in a packet switching device. One embodiment includes: a plurality of different forwarding contexts configured to identify forwarding information for packets based on their respective forwarding information base; a context forwarder configured to forward packets among the plurality of different forwarding contexts; and a plurality of back-to back virtual interface pairings, each of said back-to-back virtual interface pairings including a first virtual interface and a second virtual interface, wherein the first virtual interface of each of said back-to-back virtual interface pairings is associated with a different one of the plurality of different forwarding contexts, and wherein the second virtual interface of each of said back-to-back virtual interface pairings is associated with the context forwarder. In one embodiment, the context forwarder is configured to receive packets on the second virtual interfaces of said back-to-back virtual interface pairings and for each particular packet of said received packets on the second virtual interfaces, to identify which particular forwarding context of said plurality of different forwarding contexts to which to forward to said particular packet and to move said particular packet to said second interface of the plurality of back-to back virtual interface pairings corresponding to said particular forwarding context; and wherein the apparatus is configured to move packets received on said first interface automatically to said second interface of each of the plurality of back-to back virtual interface pairings and to move packets received on said second interface automatically to said first interface of each of the plurality of back-to back virtual interface pairings.

In one embodiment, each of the plurality of forwarding contexts is configured to attach a label corresponding to a different destination forwarding context of the plurality of forwarding contexts to a packet when the packet is determined to be forwarded to said different destination forwarding context based on its said forwarding information base; and wherein the context forwarder is configured to identify based on the label attached to said packet which of the plurality of second virtual interfaces to move the packet in response to it being received on one of the plurality of second virtual interfaces.

In one embodiment, each of the plurality of forwarding contexts is configured to attach a source label corresponding to a current forwarding context of the plurality of forwarding contexts and a destination label corresponding to a different destination forwarding context of the plurality of forwarding contexts to a packet when the packet is determined to be forwarded to said different destination forwarding context based on its said forwarding information base; and wherein the context forwarder is configured to identify based on the source and destination labels attached to said packet which of the plurality of second virtual interfaces to move the packet in response to it being received on one of the plurality of second virtual interfaces.

One embodiment includes: a first forwarding context application processor associated with at least one of said plurality of different forwarding contexts configured to apply one or more features to packets received by the first virtual interface of said at least one of said plurality of different forwarding contexts.

One embodiment moves packets between forwarding contexts in a packet switching system, with the packet switching system including a plurality of virtual interfaces, the plurality of virtual interfaces including a first virtual interface and a second virtual interface, said forwarding contexts including a first forwarding context associated with the first virtual interface and a second forwarding context associated with the second virtual interface. For each particular packet of a plurality of packets determined by the first forwarding context to be forwarded to the second forwarding context, said particular packet is moved to the first virtual interface. For each distinct packet placed into the first virtual interface, said distinct packet is moved to the second virtual interface, with said distinct packet being processed by the second forwarding context. In one embodiment, features are applied to packets at one or more of these virtual interfaces.

One embodiment includes: a first forwarding context configured to identify forwarding information for packets based on a first forwarding information base; a second forwarding context configured to identify forwarding information for packets based on a second forwarding information base; a first virtual interface configured to receive packets, the first virtual interface being associated with the first forwarding context; a second virtual interface configured to send packets, the second virtual interface being associated with the second forwarding context; and means for automatically moving all packets received by the first virtual interface but not dropped at the first virtual interface into the second virtual interface. One embodiment includes means for applying features to said packets received by the first virtual interface. One embodiment includes means for applying features to said packets received by the second virtual interface.

In one embodiment, the first and second forwarding contexts are associated with different private networks. In one embodiment, the first and second forwarding contexts are associated with different virtual routers. In one embodiment, the first and second forwarding contexts are associated with different logical routers. In one embodiment, the first forwarding context, the second forwarding context, the first virtual interface, the second virtual interface, and the context forwarder are located on a single line card of a packet switching device. In one embodiment, the first forwarding context, the second forwarding context, the first virtual interface, the second virtual interface, and the context forwarder are located on a single line card of a packet switching device.

In one embodiment, a context forwarder is simply a mechanism or process that automatically moves a packet from one virtual interface in a virtual interface pairing to the other virtual interface in the virtual interface pairing. In one embodiment, a context forwarder may determine which of multiple virtual interfaces (e.g., based on a data structure lookup operation or by another means) to automatically move a packet placed in one of its virtual interfaces. In one embodiment, a context forwarder may provide other functionality, such as, but not limited to applying features to packets (e.g., stored in one of its virtual interfaces or removed from one of its virtual interfaces).

Figure 2A:
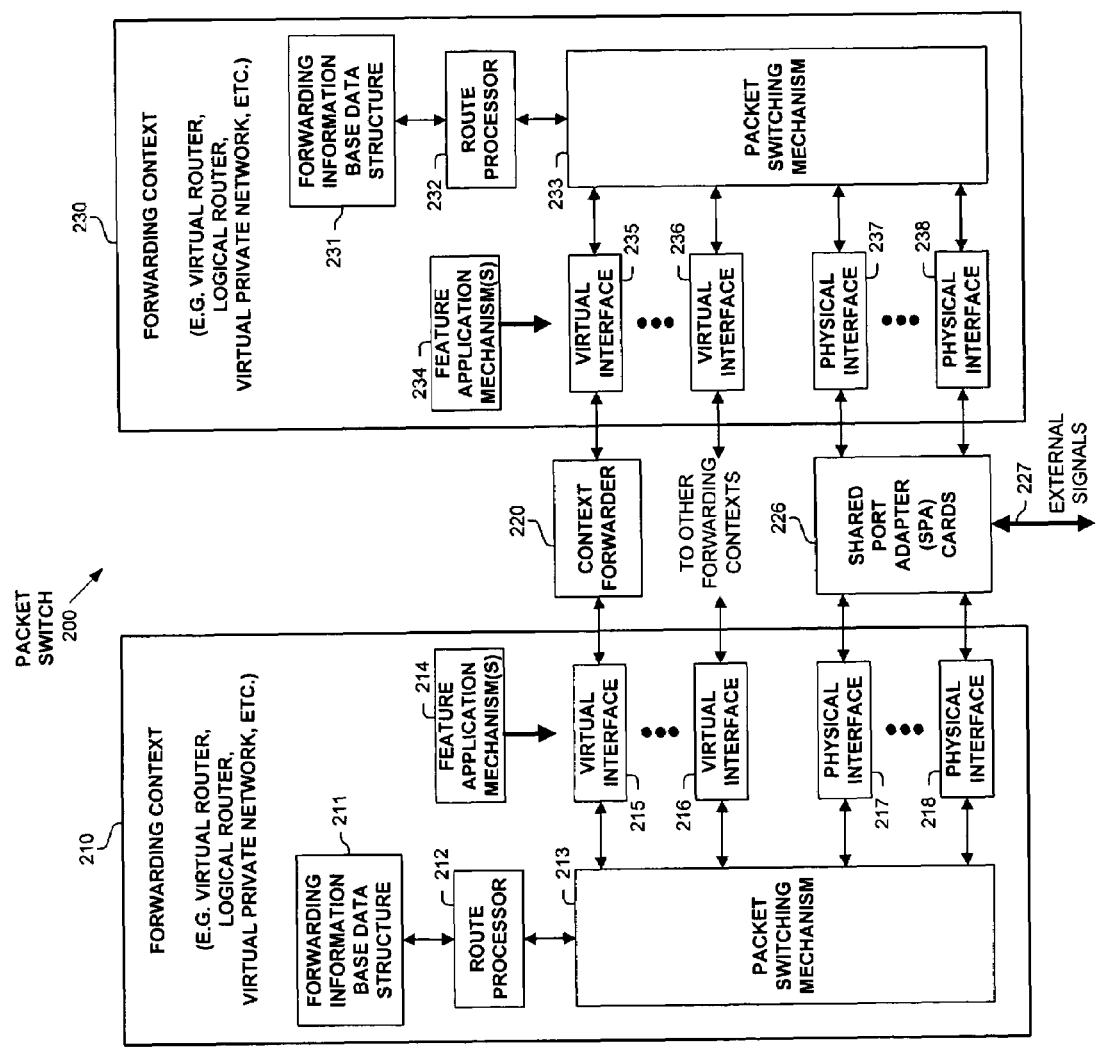
FIG. 2A is a block diagram illustrating packet switch using virtual interfaces to communicate packets between its multiple forwarding contexts.

Turning to the figures, FIG. 2A illustrates a packet switch 200, shown with two forwarding contexts 210 and 230. For ease of explanation, forwarding contexts 210 and 230 are illustrated as containing the same components; of course, in one embodiment, forwarding contexts 210 and 230 are implemented differently. Also, FIG. 2A illustrates two forwarding contexts, while one embodiment has more than two forwarding contexts, with the interconnection configuration typically implemented in a manner to meet the needs of the particular application.

As shown, forwarding context 210 (e.g., virtual router, logical router, virtual private network, etc.) includes a route processor 212 which determines where to forward packets using forwarding information base data structure 211 (e.g., forward packet to a different forwarding context—which is performed using virtual interfaces in one embodiment). In one embodiment, packet switching mechanism 213 communicatively couples virtual interfaces 215-216 and physical interfaces 217-218. Packets can be forwarded to a different forwarding context through interfaces 215-218. Physical interfaces 217-218 are connected to external communications mechanisms, such as using a shared port adapter card 226. Similar to forwarding context 210, forwarding context 230 (e.g., virtual router, logical router, virtual private network, etc.) includes a route processor 232 which determines where to forward packets using forwarding information base data structure 231. In one embodiment, packet switching mechanism 233 communicatively couples virtual interfaces 235-236 and physical interfaces 237-238. Packets can be forwarded to a different forwarding contexts through interfaces 235-238. Physical interfaces 237-238 are connected to external communications mechanisms, such as using a shared port adapter card 236.

Forwarding contexts 210 and 230 communicate packets using virtual interfaces 215 and 235. In one embodiment, when a packet is placed in one of these virtual interfaces, it is automatically moved by context forwarder 220 into its paired virtual interface in the other forwarding context. One embodiment allows features to be applied to packets at interfaces, and in which case, context forwarder 220 automatically moves all packets placed in interface 215 or 235 to the other interface, if the packet is not dropped by the application of features (214, 234). Therefore, one embodiment leverages a standard interface mechanism (which allows features to be applied to packets), but virtualizes the interface and adds a context forwarder 220 to automatically move all packets not dropped at a virtual interface to its corresponding paired virtual interface. In other words, virtual interfaces 215 and 235 are "back-to-back" interfaces in that all packets arriving at one interface (and not dropped at that interface) will be moved to the other interface. This provides an efficient mechanism for communicating packets between forwarding contexts while providing the capability to apply features to these packets at each virtual interface. Forwarding context 210 is shown to include other virtual interface(s) 216 and forwarding context 230 is shown to include other virtual interface(s) 236 which allow pair wise forwarding of packets between other forwarding contexts (not shown).

Figure 2B:
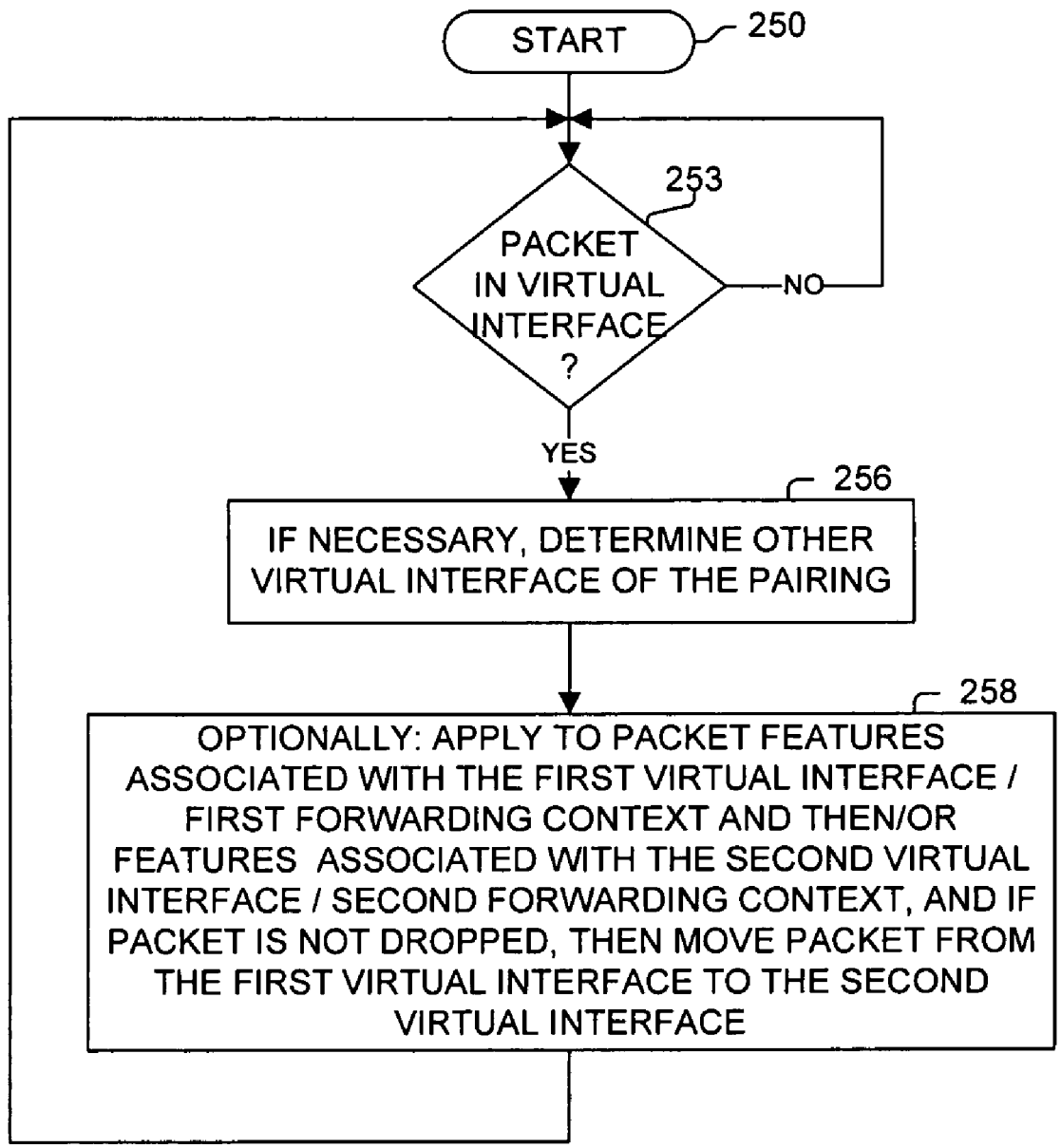
FIG. 2B is a flow diagram illustrating a process used in one embodiment for communicating packets between multiple forwarding contexts using virtual interfaces.

FIG. 2B is a flow diagram illustrates a process used in one embodiment for communicating packets between multiple forwarding contexts using virtual interfaces. Processing begins with process block 250. When there is a packet in a virtual interface as determined in process block 253, then the processing illustrated by process blocks 256-258 is performed. In process block 256, the corresponding destination virtual interface of the virtual interface pair is determined, if necessary, (e.g., in one embodiment, a context forwarder is used to move packets between multiple forwarding contexts, so it might need to determine for a source virtual interface its corresponding destination virtual interface in the pair of virtual interfaces). In process block 258, features are optionally applied to the packet, then the packet is moved from the first (source) virtual interface to the second (destination) virtual interface. In one embodiment, a first set of features associated with the first virtual interface/first forwarding context is applied to the packet, and then/or features associated with the second virtual interface/second forwarding context are applied to the packet. The application of the features can be performed by a feature application processor, by the context forwarder, or by another mechanism on a packet in or removed from a virtual interface. Processing returns to process block 253.

Figure 2C:
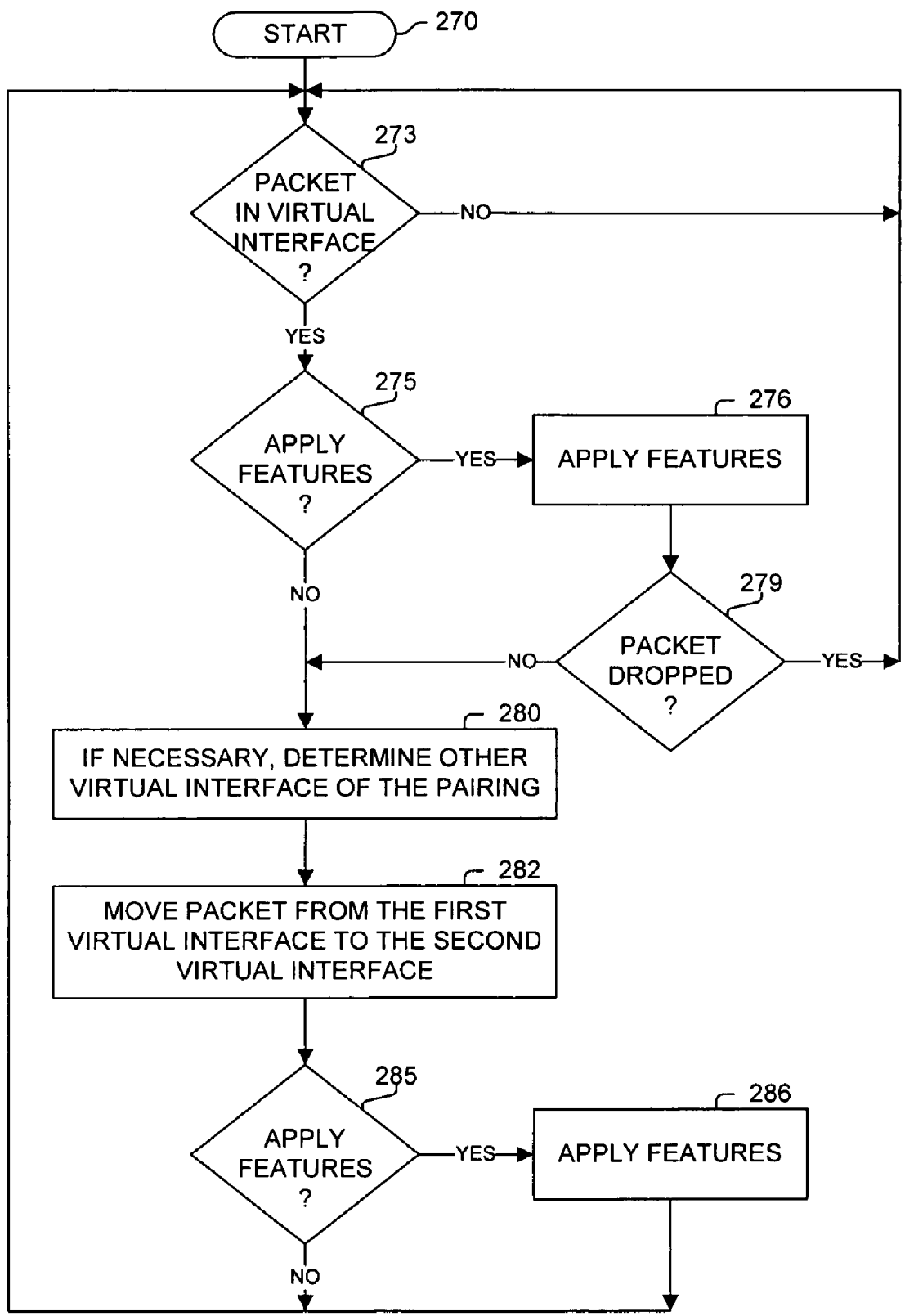
FIG. 2C is a flow diagram illustrating a process used in one embodiment for communicating packets between multiple forwarding contexts using virtual interfaces.

FIG. 2C is a flow diagram illustrates a process used in one embodiment for communicating packets between multiple forwarding contexts using virtual interfaces. Processing begins with process block 270. When there is a packet in a virtual interface as determined in process block 273, then the processing illustrated by process blocks 275-286 is performed.

As determined in process block 275, if one or more features are to be applied to the packet, then the features are applied in process block 276, and if the packet is dropped by such packet processing as determined in process block 279, then processing returns to process block 273. Otherwise, in process block 280, the corresponding destination virtual interface of the virtual interface pair is determined, if necessary, (e.g., in one embodiment, a context forwarder is used to move packets between multiple forwarding contexts, so it might need to determine for a source virtual interface its corresponding destination virtual interface in the pair of virtual interfaces).

In process block 282, the packet is moved from the first (source) virtual interface to the second (destination) virtual interface. As illustrated by process block 285-286, features can also be applied at the second (destination) virtual interface of a pairing of virtual interfaces. Processing returns to process block 273.

Figure 3A:
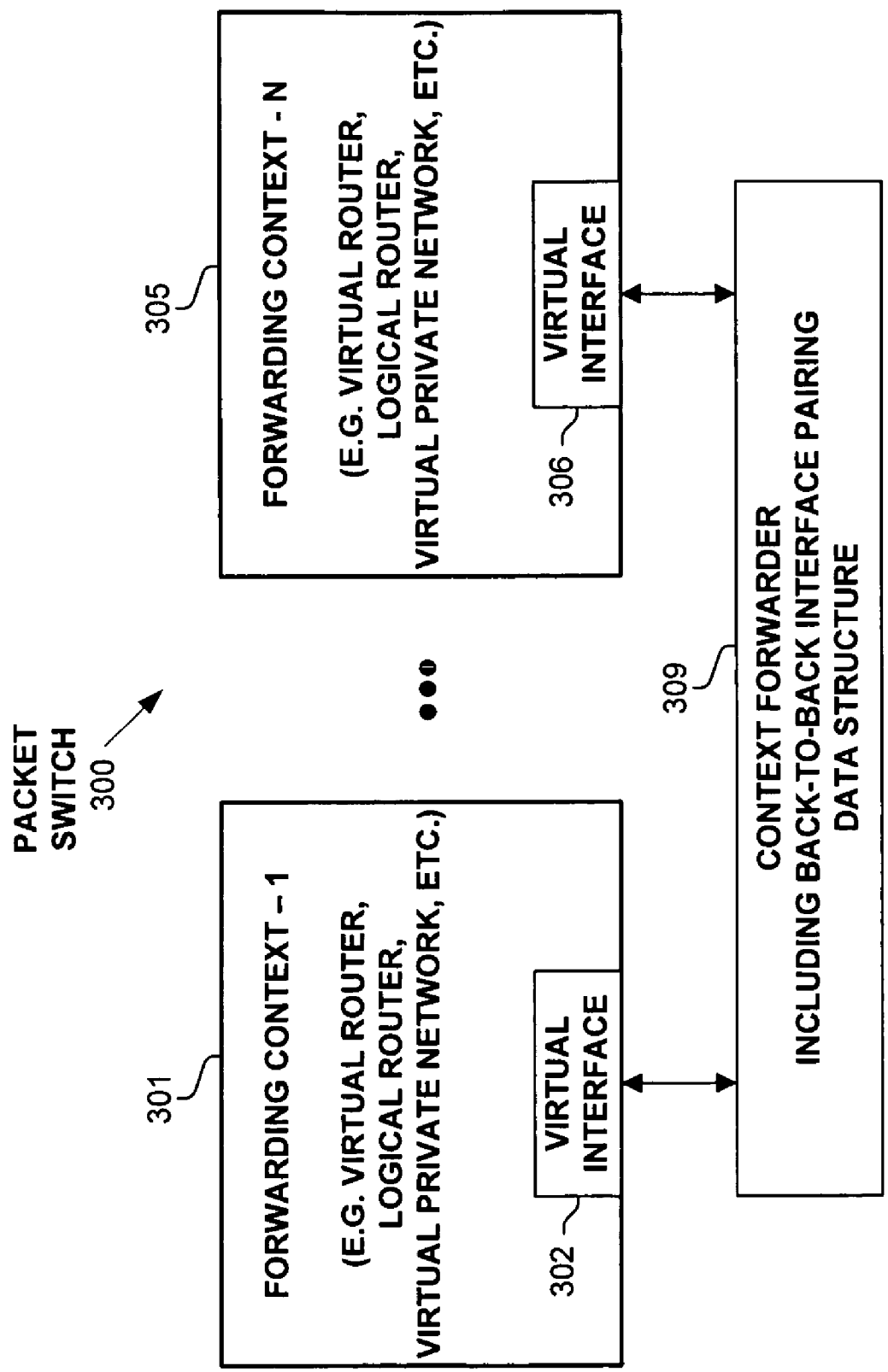
FIG. 3A is a block diagram illustrating packet switch using virtual interfaces to communicate packets between its multiple forwarding contexts.

FIG. 3A is a block diagram illustrating packet switch using virtual interfaces to communicate packets between its multiple forwarding contexts. FIG. 3A illustrates a packet switch 300 including multiple (i.e., at least two) forwarding contexts 301 and 305. Context forwarder 309 is used to move packets among these forwarding contexts 301 and 305. In one embodiment, each forwarding context 301, 305 includes a single virtual interface 302, 306. Context forwarder 309 moves a non-dropped packet from a first (source) one of the virtual interfaces 302, 306 to the second (destination) virtual interface 302, 306, after determining this destination interface based on the first virtual interface itself, a destination label and/or a source label associated with the packet such as by a route processor, or by another mechanism.

Figure 3B:
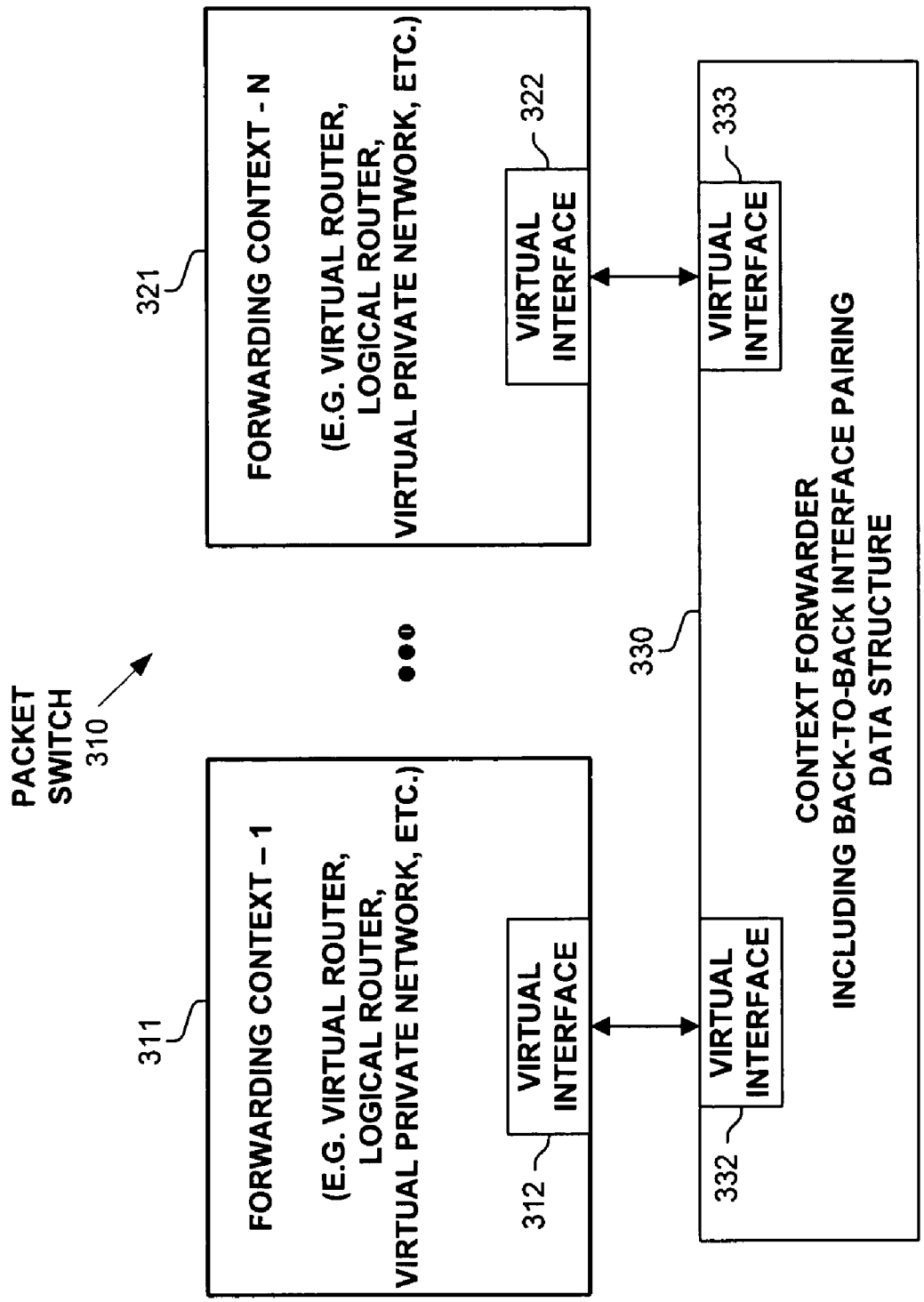
FIG. 3B is a block diagram illustrating packet switch using virtual interfaces to communicate packets between its multiple forwarding contexts.

FIG. 3B illustrates a packet switch 310 similar to that illustrated in FIG. 3A, but with a different implementation of its context forwarder. As shown, packet switch 310 includes multiple (i.e., at least two) forwarding contexts 311 and 321, with context forwarder 330 being used to move packets among these forwarding contexts 311, 321. In one embodiment, each forwarding context 311, 321 includes a single virtual interface 312, 322. Context forwarder 330 includes multiple virtual interfaces 332-333 such that a virtual interface pairing is established with a virtual interface 312, 322 in each of the forwarding contexts 311, 321. Therefore, a (non-dropped) packet placed in a virtual interface 312, 322 is automatically moved into its corresponding virtual interface 332-333 in context forwarder 330. Based on some identification mechanism (e.g., a destination label and/or a source label associated with the packet such as by a route processor, or by another mechanism), the packet is moved from one virtual interface 332-333 (within context forwarder 330) to the virtual interface 332-333 (within context forwarder 330) corresponding to the forwarding context 311, 321 to which the packet is to be moved. Packets moved to a virtual interface 332-333 from another virtual interface 332-333 are automatically moved to their corresponding virtual interface 312, 322 within a forwarding context 311, 321. Of course, features can be applied at any of these virtual interfaces 312, 322, 332, and 333, and all packets but those dropped at a virtual interface are forwarded to its corresponding destination virtual interface. In one embodiment, context forwarder is associated with a third forwarding context. The pairings of virtual interfaces and automatic movement of packets between these virtual interfaces is a flexible tool, and can be interconnected in an unlimited number of configurations.

Figure 3C:
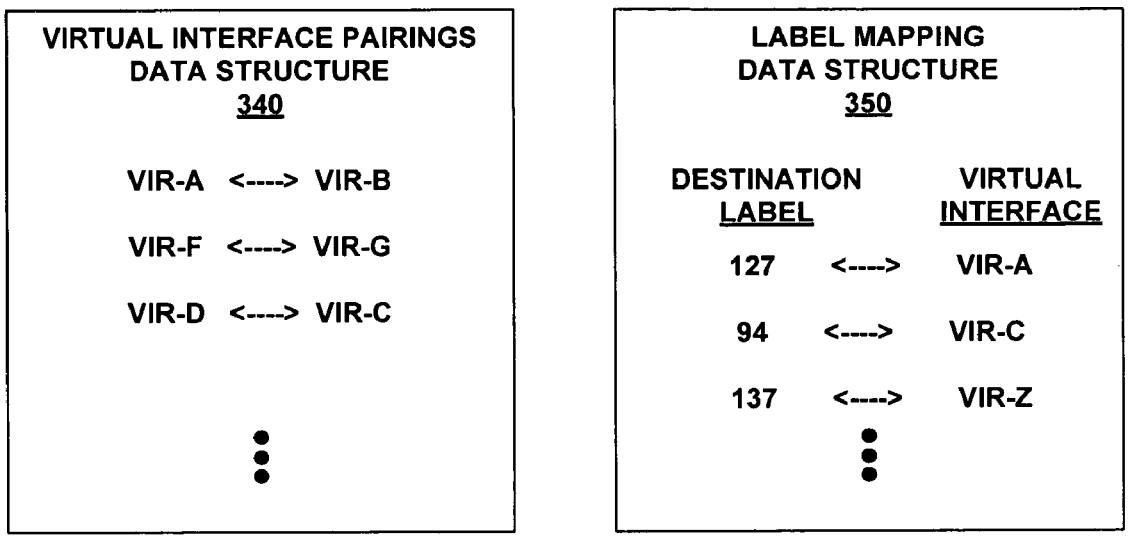
FIG. 3C illustrates exemplary data structures that may be used in one embodiment.

FIG. 3C illustrates exemplary data structures that may be used in one embodiment. In one embodiment, a virtual interface pairing data structure 340 is used to identify a predetermined pairing of virtual interfaces (e.g., for use by a context forwarder). This data structure defines that if a packet is put in a particular source virtual interface (and not dropped), then it will be automatically moved to its paired virtual interface as defined in data structure 340. In one embodiment, a label to virtual interface mapping data structure 350 is used to identify (e.g., for use by a context forwarder) the virtual interface corresponding to a label, typically attached to or associated with a packet by a route processor or other mechanism. This data structure might define, for example, that if a packet is associated with a particular label, it will be automatically moved to the virtual interface defined in data structure 350.

Figure 3D:
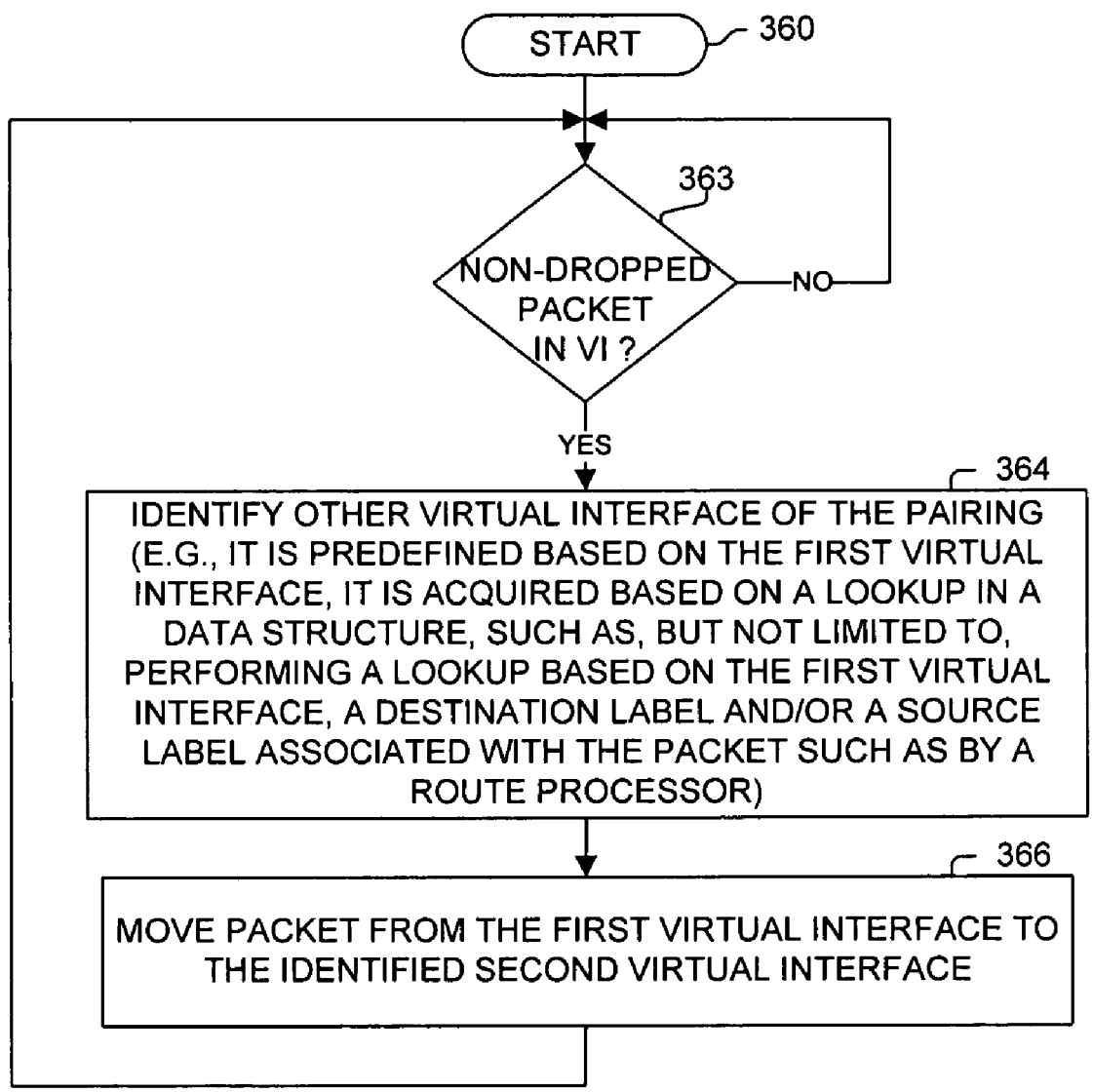
FIG. 3D is a flow diagram illustrating a process used in one embodiment for communicating packets between multiple forwarding contexts using virtual interfaces.

FIG. 3D is a flow diagram illustrating a process used in one embodiment for communicating packets between multiple forwarding contexts using virtual interfaces. Processing begins with process block 360. As determined in process block 363, if there is a non-dropped packet in a virtual interface, then in process block 364, the other virtual interface of the pairing is identified (e.g., it is predefined based on the first virtual interface, it is acquired based on a lookup in a data structure, such as, but not limited to, performing a lookup based on the first virtual interface, a destination label and/or a source label associated with the packet such as by a route processor). In process block 366, the packet is moved packet from the first virtual interface to the identified second virtual interface. Processing returns to process block 363.

Figure 4:
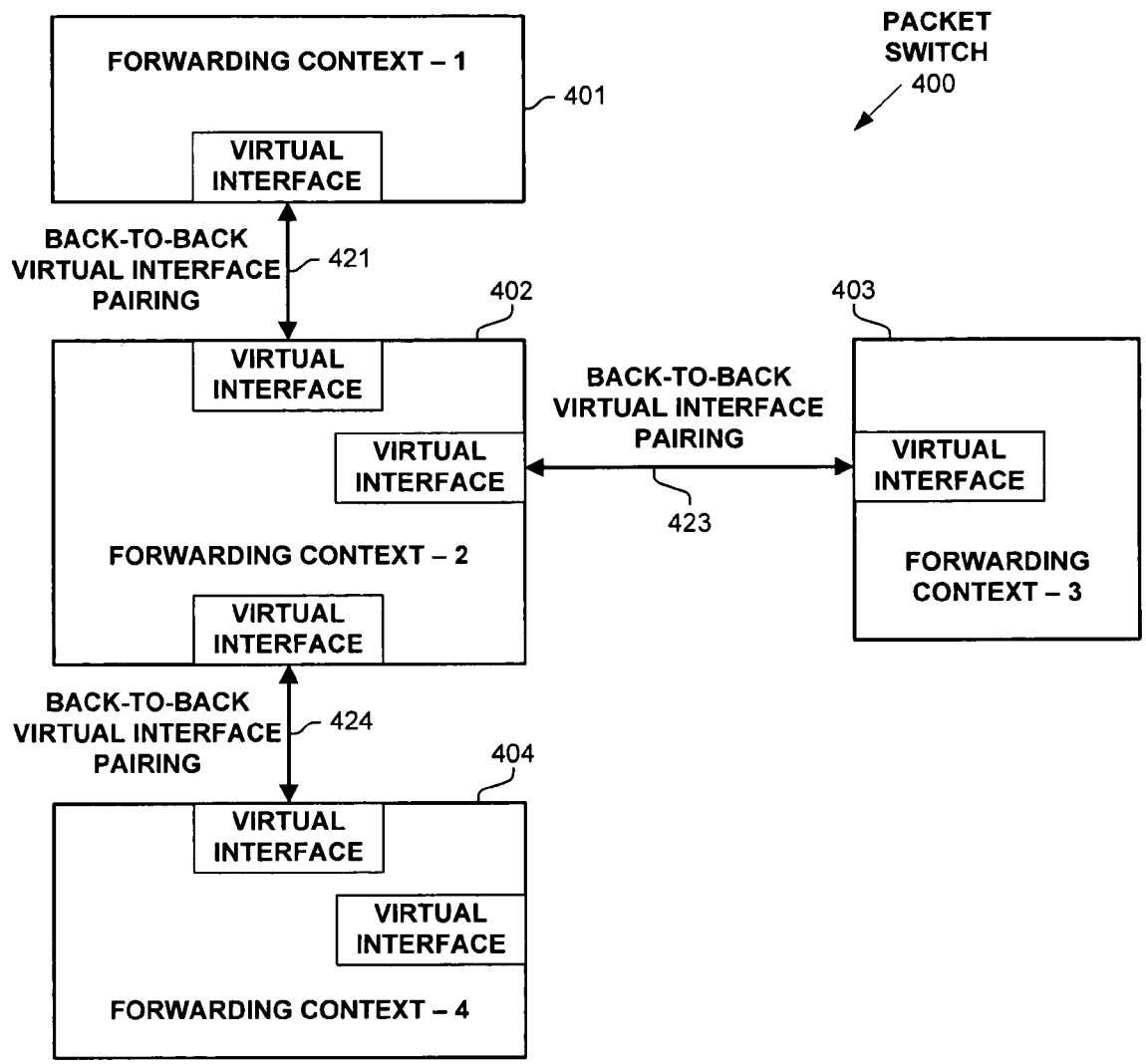
FIG. 4 is a block diagram illustrating multiple coupled forwarding contexts.

The virtual interface pairings provide a flexible and an adaptable mechanism for coupling multiple forwarding contexts (among other applications), with several of these different architectures illustrated and discussed herein. FIG. 4 further illustrates one of an extensible number of communication architectures for coupling forwarding contexts 401-404, which are coupled as shown using back-to-back virtual interface pairings 421, 423, 424. One or more context forwarders automatically move packets between the virtual interfaces of each virtual interface pairing, and features can be applied as desired at the virtual interfaces or elsewhere in packet switch 400.

For example, if a packet is to be forwarded from forwarding context-1 401 to forwarding context-4 404, then, in one embodiment, forwarding context-1 401 would identify to forward the packet to forwarding context-2 402 (e.g., the "next hop" forwarding context) and place the packet in its virtual interface of virtual interface pairing 421. The packet would be automatically moved to the corresponding virtual interface in forwarding context-2 422. Forwarding context-2 would typically process the packet to identify, typically based on a lookup operation in a forwarding information base or possibly based on a label or other information associated with the packet, to identify to forward the packet to forwarding context-4 404, and the packet would be placed in its virtual interface of virtual interface pairing 424. The packet would automatically be moved to the corresponding virtual interface within forwarding context-4 424, and available for processing by forwarding context-4 424.

Figure 5:
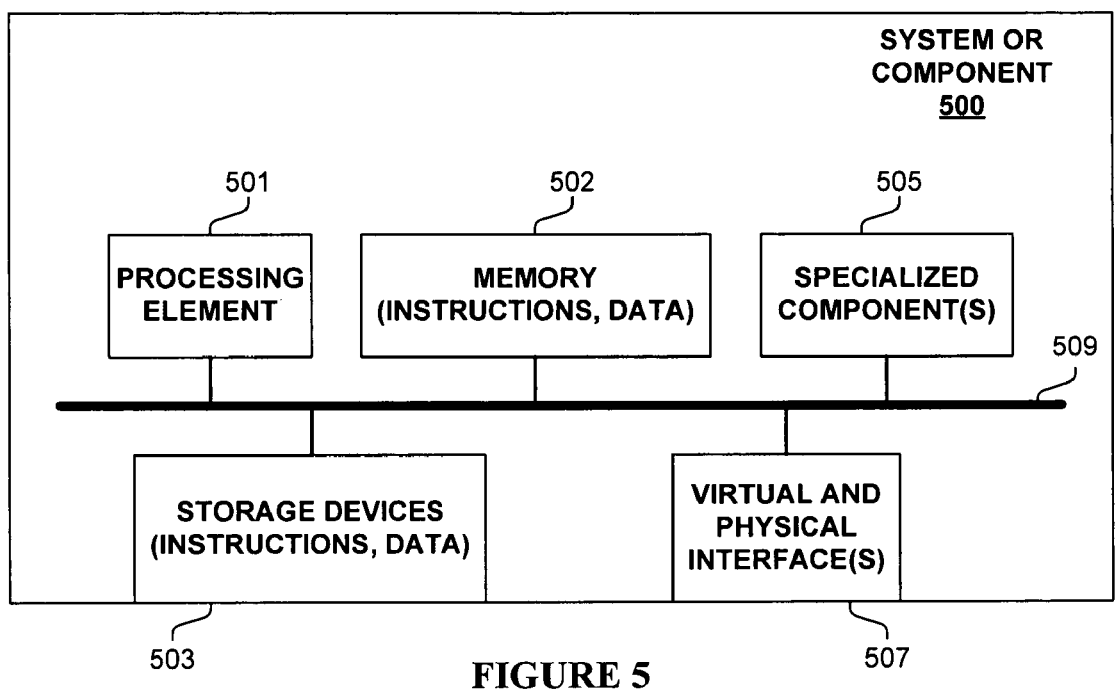
FIG. 5 is a block diagram of a system or component used in one embodiment.

FIG. 5 is block diagram of a system or component 500 used in one embodiment of a packet switching system moving packets between forwarding contexts using virtual interfaces. In one embodiment, system or component 500 performs one or more processes corresponding to one of the flow diagrams illustrated or otherwise described herein. In one embodiment, system or component 500 corresponds to a context forwarder, or portion thereof. In one embodiment, system or component 500 corresponds to a forwarding context, or portion thereof.

In one embodiment, system or component 500 includes a processing element 501, memory 502, storage devices 503, specialized components 505 (e.g. classification or event detection mechanisms), and virtual (and possibly physical) interfaces 507 for sending and receiving packets and/or communicating packets between forwarding contexts and/or with external devices or components, which are typically communicatively coupled via one or more communications mechanisms 509, with the communications paths typically tailored to meet the needs of the application.

Various embodiments of component 500 may include more or less elements. The operation of component 500 is typically controlled by processing element 501 using memory 502 and storage devices 503 to perform one or more tasks or processes. Memory 502 is one type of computer-readable medium, and typically comprises random access memory (RAM), read only memory (ROM), flash memory, integrated circuits, and/or other memory components. Memory 502 typically stores computer-executable instructions to be executed by processing element 501 and/or data which is manipulated by processing element 501 for implementing functionality in accordance with an embodiment. Storage devices 503 are another type of computer-readable medium, and typically comprise solid state storage media, disk drives, diskettes, networked services, tape drives, and other storage devices. Storage devices 503 typically store computer-executable instructions to be executed by processing element 501 and/or data which is manipulated by processing element 501 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for processing packets including the ability to move packets between forwarding contexts in a packet switching device, the apparatus comprising:
    a first forwarding context configured to identify forwarding information for packets based on a first forwarding information base;
    a second forwarding context configured to identify forwarding information for packets based on a second forwarding information base;
    a first virtual interface configured to receive packets, the first virtual interface being associated with the first forwarding context;
    a second virtual interface configured to send packets, the second virtual interface being associated with the second forwarding context;
    a context forwarder, coupled to the first and second virtual interfaces, configured to automatically move all packets that are received by the first virtual interface but not dropped at the first virtual interface into the second virtual interface; and
    a first forwarding context application processor configured to apply one or more features to said packets received by the first virtual interface before forwarding said received packets from the first virtual interface;
    wherein the first forwarding context is configured to determine for a particular packet based on the first forwarding information base to forward the particular packet to the second forwarding context, and in response to said determination, the first forwarding context is configured to move the particular packet into the first virtual interface; wherein the apparatus is configured such that the particular packet will not be dropped at the first interface; and wherein the context forwarder is configured to said automatically move all packets not dropped by said application of said features to the second virtual interface.

2. The apparatus of claim 1, wherein the first and second forwarding contexts are associated with different private networks.

3. The apparatus of claim 1, wherein the first and second forwarding contexts are associated with different virtual routers.

4. The apparatus of claim 1, wherein the first and second forwarding contexts are associated with different logical routers.

5. The apparatus of claim 4, wherein the first forwarding context, the second forwarding context, the first virtual interface, the second virtual interface, and the context forwarder are located on a single line card of a packet switching device.

6. The apparatus of claim 1, wherein the first forwarding context, the second forwarding context, the first virtual interface, the second virtual interface, and the context forwarder are located on a single line card of a packet switching device.

7. The apparatus of claim 1, including a statistics collector coupled to the second virtual interface configured to collect statistics for use in processing said packets moved to the second virtual interface.

8. The apparatus of claim 1, wherein said features include one or more access control lists (ACLs).

9. The apparatus of claim 1, wherein said features include quality of service (QoS).

10. The apparatus of claim 1, wherein said features include unicast reverse-path forwarding (uRPF).

11. An apparatus for processing packets including the ability to move packets between forwarding contexts in a packet switching device, the apparatus comprising:
 a first forwarding context configured to identify forwarding information for packets based on a first forwarding information base;
 a second forwarding context configured to identify forwarding information for packets based on a second forwarding information base;
 a first virtual interface configured to receive packets, the first virtual interface being associated with the first forwarding context;
 a second virtual interface configured to send packets, the second virtual interface being associated with the second forwarding context; and
 a context forwarder, coupled to the first and second virtual interfaces, configured to automatically move all packets that are received by the first virtual interface but not dropped at the first virtual interface into the second virtual interface;
 wherein the first forwarding context is configured to determine for a particular packet based on the first forwarding information base to forward the particular packet to the second forwarding context, and in response to said determination, the first forwarding context is configured to move the particular packet into the first virtual interface; wherein the apparatus is configured such that the particular packet will not be dropped at the first interface; and wherein the apparatus is configured to apply one or more features to said packets in the first virtual interface and said packets in the second virtual interface.

12. The apparatus of claim 11, wherein the apparatus is configured to collect statistics on packets received into the first virtual interface for use in processing said packets in the first virtual interface and is configured to collect statistics on packets received into the second virtual interface for use in processing said packets in the second virtual interface.

13. The apparatus of claim 11, wherein said features include one or more access control lists (ACLs).

14. The apparatus of claim 11, wherein said features include quality of service (QoS).

15. The apparatus of claim 11, wherein said features include unicast reverse-path forwarding (uRPF).

16. An apparatus for processing packets including the ability to move packets between forwarding contexts in a packet switching device, the apparatus comprising:
 a plurality of different forwarding contexts configured to identify forwarding information for packets based on their respective forwarding information base;
 a context forwarder configured to forward packets among the plurality of different forwarding contexts;
 a plurality of back-to back virtual interface pairings, each of said back-to-back virtual interface pairings including a first virtual interface and a second virtual interface, wherein the first virtual interface of each of said back-to-back virtual interface pairings is associated with a different one of the plurality of different forwarding contexts, and wherein the second virtual interface of each of said back-to-back virtual interface pairings is associated with the context forwarder; and
 a first forwarding context application processor associated with at least one of said plurality of different forwarding contexts configured to apply one or more features to packets received by the first virtual interface of said at least one of said plurality of different forwarding contexts before forwarding said received packets from the first virtual interface;
 wherein the context forwarder is configured to receive packets on the second virtual interfaces of said back-to-back virtual interface pairings and for each particular packet of said received packets on the second virtual interfaces, to identify which particular forwarding context of said plurality of different forwarding contexts to which to forward to said particular packet and to move said particular packet to said second interface of the plurality of back-to-back virtual interface pairings corresponding to said particular forwarding context; and wherein the apparatus is configured to move packets received on said first interface automatically to said second interface of each of the plurality of back-to-back virtual interface pairings and to move packets received on said second interface automatically to said first interface of each of the plurality of back-to back virtual interface pairings.

17. The apparatus of claim 16, wherein each of the plurality of forwarding contexts is configured to attach a label corresponding to a different destination forwarding context of the plurality of forwarding contexts to a packet when the packet is determined to be forwarded to said different destination forwarding context based on its said forwarding information base; and wherein the context forwarder is configured to identify based on the label attached to said packet which of the plurality of second virtual interfaces to move the packet in response to it being received on one of the plurality of second virtual interfaces.

18. The apparatus of claim 16, wherein each of the plurality of forwarding contexts is configured to attach a source label corresponding to a current forwarding context of the plurality of forwarding contexts and a destination label corresponding to a different destination forwarding context of the plurality of forwarding contexts to a packet when the packet is determined to be forwarded to said different destination forwarding context based on its said forwarding information base; and wherein the context forwarder is configured to identify based on the source and destination labels attached to said packet which of the plurality of second virtual interfaces to move the packet in response to it being received on one of the plurality of second virtual interfaces.

19. The apparatus of claim 16, wherein each of the plurality of different forwarding contexts is associated with different private networks.

20. The apparatus of claim 16, wherein each of the plurality of different forwarding contexts is associated with different virtual routers.

21. The apparatus of claim 16, wherein each of the plurality of different forwarding contexts is associated with different logical routers.

22. The apparatus of claim 16, wherein each of the plurality of different forwarding contexts and the context forwarder are located on a single line card of a packet switching device.

23. The apparatus of claim 16, wherein said features include one or more access control lists (ACLs).

24. The apparatus of claim 16, wherein said features include quality of service (QoS).

25. The apparatus of claim 16, wherein said features include unicast reverse-path forwarding (uRPF).

26. A method for use in moving packets between forwarding contexts in a packet switching system, the method comprising:

for each particular packet of a plurality of packets determined by a first forwarding context of said forwarding contexts, based on a first forwarding information base, to be forwarded to a second forwarding context of said forwarding contexts, moving said particular packet to a first virtual interface, with one or more first interface features being applied to said particular packet at the first virtual interface; and for each distinct packet placed into the first virtual interface and not dropped by said application of said one or more first interface features, automatically moving said distinct packet to a second virtual interface by a context forwarder, with said distinct packet being processed by the second forwarding context;

wherein the first forwarding context is associated with the first virtual interface and the first forwarding information base for identifying forwarding information for packets within the first forwarding context; and wherein the second forwarding context is associated with the second virtual interface and a second forwarding information base for identifying forwarding information for packets within the second forwarding context.

27. The method of claim 26, comprising: for each moved packet received into the second virtual interface, applying one or more second features to said moved packet.

28. The method of claim 27, comprising: for each said moved packet received into the second virtual interface which is not dropped by said application of the second features to said packet, determining within the second forwarding context where to forward said packet and forwarding said packet.

29. The method of claim 26, comprising: for each said moved packet received into the second virtual interface, determining within the second forwarding context where to forward said packet and forwarding said packet.

30. The apparatus of claim 26, wherein said features include one or more access control lists (ACLs).

31. The apparatus of claim 26, wherein said features include quality of service (QoS).

32. The apparatus of claim 26, wherein said features include unicast reverse-path forwarding (uRPF).

\* \* \* \* \*